US011359482B2

(12) United States Patent
Gao et al.

(10) Patent No.: US 11,359,482 B2
(45) Date of Patent: Jun. 14, 2022

(54) DOWNHOLE LEAK MONITOR SYSTEM

(71) Applicant: Halliburton Energy Services, Inc., Houston, TX (US)

(72) Inventors: Li Gao, Katy, TX (US); Krishna Ravi, Kingwood, TX (US); Avinash Taware, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 273 days.

(21) Appl. No.: 16/330,330

(22) PCT Filed: Dec. 7, 2016

(86) PCT No.: PCT/US2016/065413
§ 371 (c)(1),
(2) Date: Mar. 4, 2019

(87) PCT Pub. No.: WO2018/106231
PCT Pub. Date: Jun. 14, 2018

(65) Prior Publication Data
US 2019/0226324 A1 Jul. 25, 2019

(51) Int. Cl.
*E21B 47/10* (2012.01)
*G01M 3/00* (2006.01)
(Continued)

(52) U.S. Cl.
CPC ............. *E21B 47/10* (2013.01); *G01M 3/002* (2013.01); *G01M 3/18* (2013.01); *G01M 3/243* (2013.01);
(Continued)

(58) Field of Classification Search
CPC ....... E21B 47/10; G01M 3/2815; G01M 3/18; G01M 3/2807; G01M 3/002; G01M 3/243
See application file for complete search history.

(56) References Cited

U.S. PATENT DOCUMENTS

2003/0235113 A1  12/2003  Da Silva et al.
2008/0106972 A1*  5/2008  Liang .................. E21B 47/12
                                                 367/25
(Continued)

FOREIGN PATENT DOCUMENTS

WO  2015-153537      10/2015
WO  2016-108914 A1   7/2016
(Continued)

OTHER PUBLICATIONS

International Search Report & Written Opinion issued for corresponding International Application No. PCT/US2016/065413 dated Aug. 25, 2017. (17 pages).

*Primary Examiner* — David Z Huang
(74) *Attorney, Agent, or Firm* — McGuireWoods LLP

(57) ABSTRACT

The disclosed embodiments include downhole leak monitor systems, downhole leak monitors, and methods to monitor downhole leaks. In one embodiment, a downhole leak monitor system includes a plurality of downhole leak monitors (monitor), where each monitor is deployed along a casing of a wellbore. Each monitor is operable to detect at least one property of a fluid flow through an aperture of a barrier and to determine a location of the aperture. Each monitor is also operable to establish a connection with at least one other monitor, the connection being one of a plurality of connections, together which, communicatively connects the monitor to a top monitor. Each of the monitor is further operable to transmit data indicative of the at least one property of the fluid flow and the location of the aperture to the at least one other monitor.

20 Claims, 5 Drawing Sheets

(51) Int. Cl.
*G01M 3/24* (2006.01)
*G01M 3/28* (2006.01)
*G01M 3/18* (2006.01)
*E21B 47/12* (2012.01)

(52) U.S. Cl.
CPC ........ *G01M 3/2807* (2013.01); *G01M 3/2815* (2013.01); *E21B 47/12* (2013.01)

(56) References Cited

U.S. PATENT DOCUMENTS

| | | | |
|---|---|---|---|
| 2011/0049901 A1* | 3/2011 | Tinnen | E21B 41/0085 290/54 |
| 2016/0010447 A1 | 1/2016 | Merino | |
| 2017/0167246 A1* | 6/2017 | Minhas | E21B 21/08 |

FOREIGN PATENT DOCUMENTS

| | | |
|---|---|---|
| WO | 2016115012 | 7/2016 |
| WO | 2016115030 | 7/2016 |

\* cited by examiner

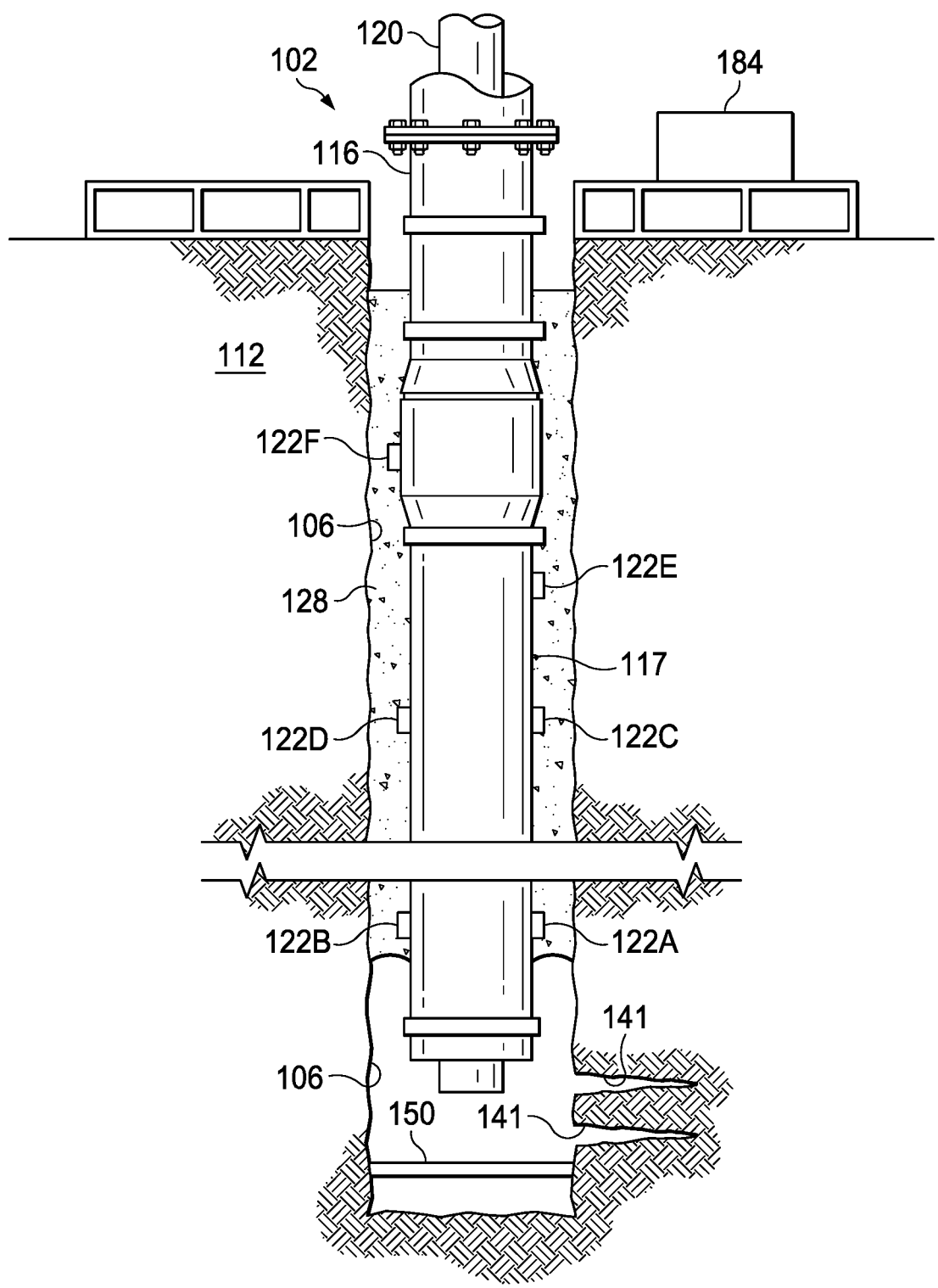

DOWNHOLE LEAK MONITOR SYSTEM

BACKGROUND

The present disclosure relates generally to downhole leak monitor systems, downhole leak monitors, and methods to monitor downhole leaks.

A wellbore is often drilled proximate to a subterranean deposit of hydrocarbon resources to facilitate exploration and production of hydrocarbon resources. Casing sections are often coupled together to extend an overall length of a casing (e.g., a production casing, an intermediate casing, or a surface casing) that is deployed in the wellbore to insulate downhole tools and strings deployed in the casing as well as hydrocarbon resources flowing through casing from the surrounding formation, to prevent cave-ins, and/or to prevent contamination of the surrounding formation.

A cement job is usually performed to fixedly secure the casing to the wellbore and to form a barrier that isolates different zones of the wellbore. For example, cement sheath may be deposited around a section of the casing to form a barrier that seals the casing from a nearby underground fluid reservoir. Cement sheath may also be deposited at an end of the section of casing to seal said section from other sections of the casing for a desired operational duration.

Over time, the cement sheath may weaken and one or more leaks (apertures) may form at different sections of the cement sheath. Reservoir fluids that were previously isolated from the casing or isolated from one or more sections of the casing by the cement sheath may leak through the cement sheath and may affect the integrity of the well and jeopardize hydrocarbon production.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1C is a production environment in which the downhole leak monitors of FIG. 1A are deployed along the casing of the wellbore;

Figure 1A:
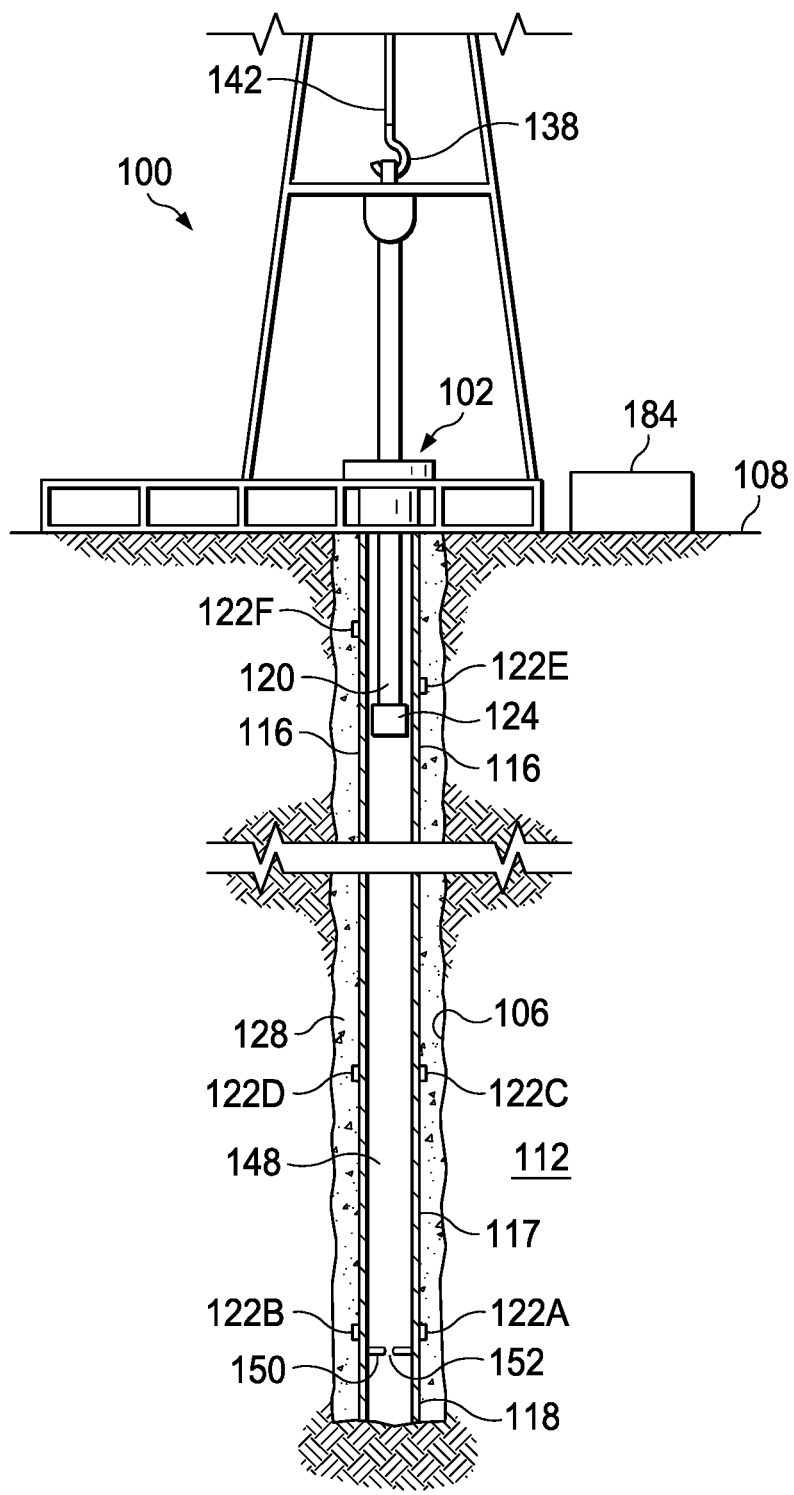
FIG. 1A is a schematic, side view of a well environment that includes a plurality of downhole leak monitors deployed along a casing of a wellbore.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole leak monitor systems, methods to monitor downhole leaks, and downhole leak monitors. More particularly, downhole leak monitors are deployed along sections of a wellbore casing (casing), such as a surface casing, an intermediate casing, and/or production casing. In some embodiments, a plurality of downhole leak monitors are deployed along a longitudinal axis of the casing from a top downhole leak monitor that is deployed at a location proximate the surface to a bottom downhole leak monitor, that is deployed proximate a bottom end of the wellbore. Some downhole leak monitors of the plurality of downhole leak monitors are deployed proximate a barrier in the wellbore. As defined herein, a barrier may be a naturally formed formation or a manufactured material that isolates the internal cavity of the casing from fluid deposits in the formation or isolates a section of the casing from another section of the casing. For example, the barrier may be the formation that forms the boundaries of the wellbore, cement sheath deposited around the casing, cement sheath deposited in between two sections of the casing, as the casing wall, a packer, or another device operable to isolate the internal cavity of the casing.

Further, each downhole leak monitor is operable to detect properties of fluid flow through an aperture of the barrier proximate the downhole leak monitor. Fluid flow, as defined herein, means any fluid that is in motion as opposed to being sedentary. Properties of the fluid flow include material properties of the fluid flow, flow rate of the fluid flow, conductivity of the fluid flow, resistivity of the fluid flow, amount of acoustic pressure emitted by the fluid flow, velocity of the fluid flow, acceleration of the fluid flow, as well as other measurable characteristics of the fluid flow.

Each downhole leak monitor is operable to determine a location of the aperture based on properties of the fluid flow that are determined by said downhole leak monitor. Further, each downhole leak monitor is operable to establish a connection with one or more downhole leak monitors within proximity of the respective downhole leak monitor. Moreover, multiple connections may be formed by multiple downhole leak monitors that are within proximity to each other, thereby facilitating communication between downhole leak monitors that are deployed hundreds or thousands of feet from each other.

In some embodiments, each downhole leak monitor transmits data indicative of the location of the aperture and properties of the fluid flow to an adjacent downhole leak monitor until said data is transmitted to the top downhole leak monitor, which is the downhole leak monitor that is most proximate to the surface of the wellbore. In one of such embodiments, the top downhole leak monitor then transmits said data to a surface based electronic device that is accessible to an operator. In another one of such embodiments, the top downhole leak monitor transmits said data to a telecommunication cable such as a wireline cable or an optical fiber, which in turn transmits said data to the surface based electronic device. In further embodiments, the top downhole leak monitor transmits said data to a downhole tool that is deployed in the wellbore, and the downhole tool in turn provides said data to the surface based electronic device. In some embodiments, one or more downhole leak monitors are operable to perform long hop transmissions to transmit said data to a non-adjacent downhole leak monitor. Additional descriptions of downhole leak monitors are provided in the below paragraphs and are illustrated in at least FIGS. 1-4.

Now turning to the figures, FIG. 1A is a schematic, side view of a well environment 100 that includes a plurality of downhole leak monitors 122A-122F deployed along a casing 116 of a wellbore 106. In the embodiment of FIG. 1A, a well 102 having the wellbore 106 extends from a surface 108 of the well 102 to or through the subterranean formation 112. The casing 116 is deployed along the wellbore 106 to insulate downhole tools and devices deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 128 formed from cement slush, and deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A hook 138, cable 142, traveling block (not shown), hoist (not shown), and conveyance 120 are provided to lower a downhole tool 124 down the wellbore 106 or to lift the downhole tool 124 up from the wellbore 106. The conveyance 120 may be wireline, slickline, coiled tubing, drill pipe, production tubing, downhole tractor, or another type of conveyance. In some embodiments, the conveyance 120 is also operable to deploy a downhole tool, such as the downhole tool 124 at various depths of the wellbore 106.

First, second, third, fourth, fifth, and sixth downhole leak monitors 122A-122F are deployed at various locations along the casing 116. Moreover, the first downhole leak monitor 122A is deployed in a first zone 117 of the wellbore 106 proximate a first barrier 150 that isolates the first zone 117 from a second zone 118 of the wellbore 106. In some embodiments, the first barrier is formed from a cement sheath. In other embodiments, the barrier is a packer or another device operable to isolate the first zone 117 from the second zone 118. When an aperture 152 penetrates the first barrier 150 and fluid from the second zone 118 flows through the aperture 152 into the first zone 117, properties of the fluid flow are detected by the first downhole leak monitor 122A. The first downhole leak monitor 122A determines the location of the aperture 152 based on the properties of the fluid flow. For example, the first downhole leak monitor 122A detects a change in pressure proximate a surface of the first barrier 150 due to fluid flow through the surface of the first barrier 150. The first downhole leak monitor 122A then determines a location of the aperture based on a location where the change in pressure is greater than a threshold PSI. In some embodiments, the first downhole leak monitor 122A also receives data indicative of properties of the fluid flow from another downhole leak monitor, such as the second downhole leak monitor 122B and determines the location of the aperture based properties of the aperture detected by the first downhole leak monitor 122A and data received from the second downhole leak monitor 122B that are indicative of the properties of the aperture 152.

In further embodiments, one or more detectors (not shown) that are operable to detect properties of the fluid flow are deployed in the annulus 148, embedded in the barrier 150, and/or deployed at another location that is proximate to the first downhole leak monitor 122A. In one of such embodiments, the one or more detectors are further operable to determine the location of the aperture and provide data indicative of the location of the aperture 152 to the first downhole leak monitor 122A. In another one of such embodiments, the one or more detectors are further operable to determine properties of the fluid flow and are operable to provide data indicative of the properties of the fluid flow to the first downhole leak monitor 122A. In such embodiments, the first downhole leak monitor 122A determines the location of the aperture based properties of the aperture detected by the first downhole leak monitor 122A and data received from the detectors that are indicative of the properties of fluid flow through the aperture 152. Additional descriptions regarding detecting properties of the fluid flow and determining the location of the aperture 152 are provided in more detail in the paragraphs below and are illustrated in at least FIGS. 2-4.

In some embodiments, the first downhole leak monitor 122A establishes a connection (first connection) with the third downhole leak monitor 122C, which is deposited adjacent to the first downhole leak monitor 122A. As defined herein, a downhole leak monitor is adjacent to another downhole leak monitor if no other downhole leak monitor is deployed between said two downhole leak monitors. The first downhole leak monitor 122A then transmits data indicative of the location of the aperture 152 and properties of the fluid flow to the third downhole leak monitor 122C. The third downhole leak monitor 122C in turn establishes a connection (second connection) with the fifth downhole leak monitor 122E and transmits said data to the fifth downhole leak monitor 122E. In some embodiments, the third downhole leak monitor 122C also performs operations described herein to determine the location of the aperture 152 and properties of the fluid flow, and transmits data determined by the third downhole leak monitor 122C to the fifth downhole leak monitor 122E. In other embodiments, the first downhole leak monitor 122A is operable to establish a long hop connection with the fifth downhole leak monitor 122E. As defined herein, a long hop connection is established between two downhole leak monitors that are not adjacent to each other.

In some embodiments, the fifth downhole leak monitor 122E is deployed proximate to the surface 108 and is operable to transmit said data to a surface based electronic device such as a controller 184 that is accessible by an operator. In other embodiments, the fifth downhole leak monitor 122E provides said data to the downhole 124 or to a telecommunication cable, and the said data are transmitted to the controller 184 by the downhole tool 124 or through the telecommunication cable. In some embodiments, the controller 184 receives multiple sets of data indicative of the location of the aperture 152 and the properties of the fluid flow through the aperture 152, where each set of data is generated by a different downhole leak monitor of the plurality of downhole leak monitors. In one of such embodiments, the controller 184 performs array-signal processing techniques, such as beamforming, Capon's beamforming, Multiple Signal Classification (MUSIC), parametric analysis, azimuthal analysis, and similar techniques to determine the location of the aperture 152 as well as the properties of the fluid flow through the aperture 152 based on the multiple sets of data.

The second downhole leak monitor 122B, similar to the first downhole leak monitor 122A is operable to perform operations described herein to detect properties of fluid flow through the aperture 152, determine the location of the aperture 152, and establish a connection with the fourth downhole leak monitor 122D and/or a long hop connection with the sixth downhole leak monitor 122F. Further, the third, fourth, fifth, and sixth downhole leak monitors 122C-122E are also operable to perform operations described herein to detect properties of fluid flow through the aperture 152 and to determine the location of the aperture 152. Although FIG. 1A illustrates six downhole leak monitors 122A-122F deployed in the wellbore 106, a different number of downhole leak monitors may be deployed downhole.

Figure 1B:
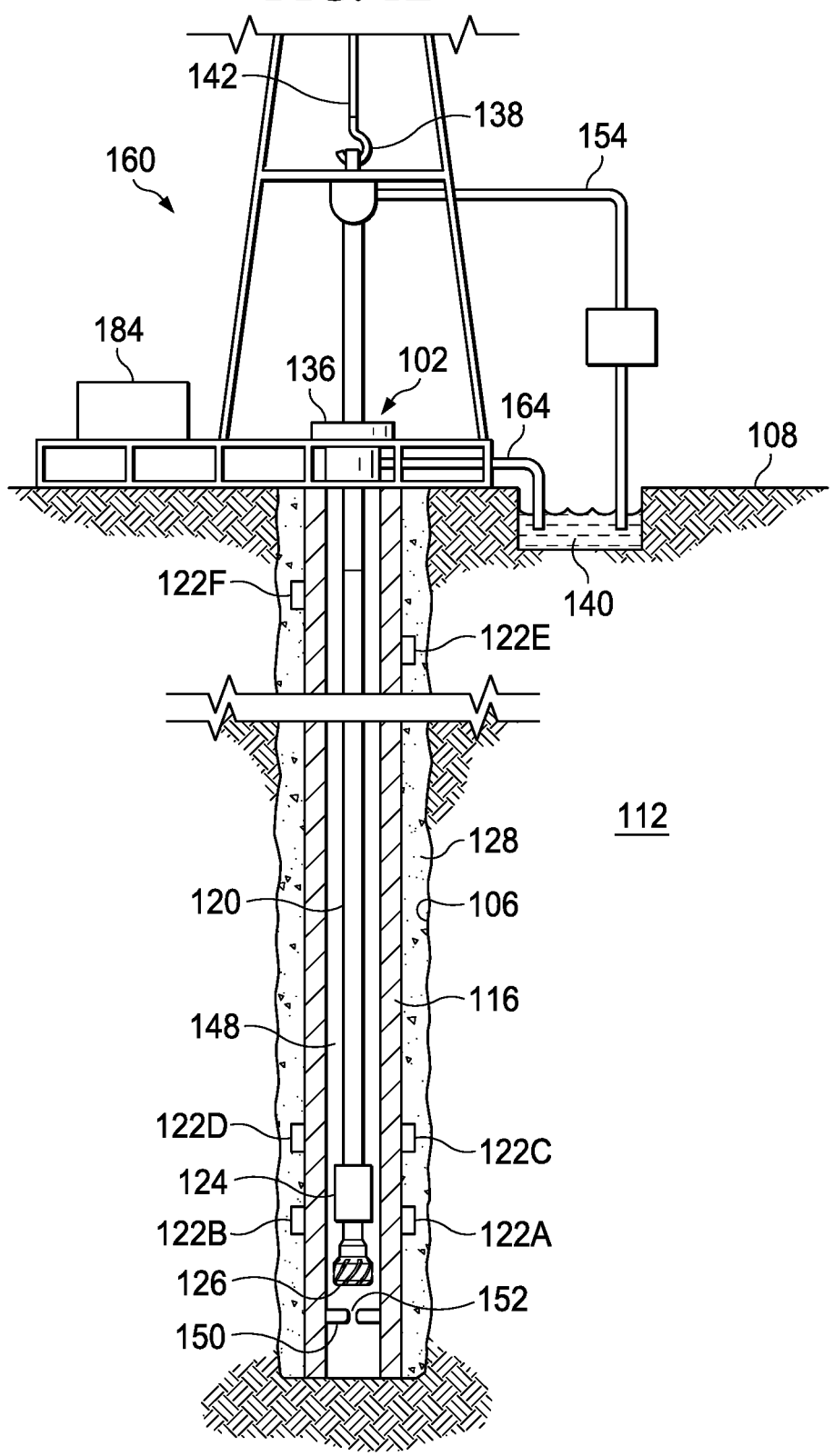
FIG. 1B is a drilling environment in which the downhole leak monitors of FIG. 1A are deployed along the casing of the wellbore.

FIG. 1B illustrates a drilling environment 160 in which the leak monitors 122A-122F are deployed along the casing 116 of the wellbore 106. At wellhead 136, an inlet conduit 154 is coupled to a fluid source (not shown) to provide fluids, such as cement mixtures, drilling fluids, displacement fluids or other fluids downhole. The conveyance 120 has an internal cavity that provides a fluid flow path from the surface 108 downhole. The fluids travel down the conveyance 120, and exit the conveyance 120 at drill bit 126. The fluids flow through an annulus 148 between the casing 116 and the surrounding formation 112 to an outlet conduit 164, and eventually into a container 140. A pump (not shown) may also facilitate fluid flow through the annulus 148 and the outlet conduit 164. The leak monitors 122A-122F are deployed along the casing 116 in the first zone 117 of the wellbore 106. The leak monitors 122A-122F are operable to perform the operations described herein to detect presence of a leak in a barrier that isolates the first zone 117 of the wellbore 106 and detect at least one property of a fluid flow through the leak.

FIG. 1C illustrates a production environment 180 in which the leak monitors 122A-122F are deployed along the casing 116 of the wellbore 106. Once the well 102 has been prepared and completed, and the leak monitors 122A-122F have been deployed along the wellbore 106, the leak monitors 122A-122F may operate during the production stage of the well 102. In the embodiment of FIG. 1C, perforations 141 are formed within the first zone 117 of the wellbore. Further, the barrier 150 is formed to isolate the first zone 117 of the wellbore 106. The leak monitors 122A-122F are operable to perform the operations described herein to detect presence of a leak in the barrier 150 and detect at least one property of a fluid flow through the leak.

Figure 2:
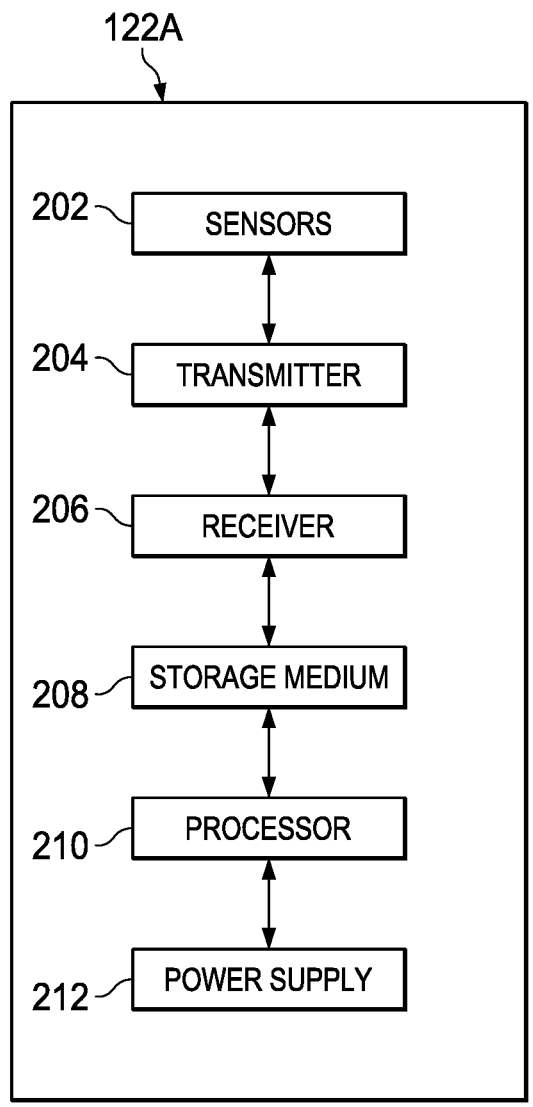
FIG. 2 illustrates a block diagram of components of one of the downhole leak monitors of FIG. 1A.

FIG. 2 illustrates a block diagram of components the first downhole leak monitor 122A of FIG. 1A. The first downhole leak monitor 122A includes sensors 202 operable to determine properties of the fluid flow. In some embodiments, the sensors 202 include a pressure sensor that senses a pressure level across the barrier 150 as well as a change in pressure across a local region of the barrier 150. In some embodiments, the sensors 202 also include a thermometer that senses a temperature across the barrier 150 as well as a change in temperature across a local region of the barrier 150. In further embodiments, the sensors 202 also include an acoustic sensor that senses acoustic vibrations across the barrier 150 and changes to acoustic vibrations across a local region of the barrier 150. In further embodiments, the sensors include sensors that are operable to determine the material property, conductivity, resistivity, salinity, vibration, displacement, velocity, torque, acceleration, and other properties of the fluid flow disclosed herein.

The first downhole leak monitor 122A includes a transmitter 204 that is operable to transmit data indicative of the properties of the fluid flow and the location of the aperture 152 to another downhole leak monitor. The first downhole leak monitor 122A also includes a receiver 206 that operable to receive, from another downhole leak monitor, a detector, or another downhole device, data indicative of the properties of the fluid flow and the location of the aperture 152. In some embodiments, the transmitter 204 and the receiver 206 are components of a transceiver (not shown) that is also operable to receive data indicative of the properties of the fluid flow and the location of the aperture 152 and to transmit said data to another downhole leak monitor.

The first downhole leak monitor 122A also includes a storage medium 208. The storage medium 208 may be formed from data storage components such as, but not limited to, read-only memory (ROM), random access memory (RAM), flash memory, magnetic hard drives, solid state hard drives, as well as other types of data storage components and devices. In some embodiments, the storage medium 208 includes multiple data storage devices. Data detected by the sensors 202 and received from other downhole leak monitors are stored on the storage medium 208. The storage medium 208 also includes instructions for operating the first downhole leak monitor 122A as well as instructions for establishing connections with other downhole leak monitors. In some embodiments, the storage medium 208 also includes identifications of all of the downhole leak monitors 122A-122F that are deployed in the wellbore 106, and approximate locations of the downhole leak monitors 122A-122F.

The first downhole leak monitor 122A also includes a processor 210 that is operable to execute the instructions stored in the storage medium 208 to determine properties of the fluid flow described herein. The processor 210 is also operable to determine the location of the aperture 152 based on the properties of the fluid flow. In some embodiments, the processor 210 is operable to determine the location of the fluid flow based on data received from other sensors. In one of such embodiments, the processor 210 is operable to triangulate the location of the aperture 152 based on data provided by the second sensor 122B and indicative of properties of the fluid flow. In some embodiments, the processor 210 is further operable to preform array-signal processing techniques, such as beamforming, Capon's beamforming, MUSIC, parametric analysis, azimuthal analysis, and similar techniques to determine the location of the aperture 152.

The processor 210 is further operable to establish connections with adjacent and non-adjacent downhole leak monitors, operate the transmitter 204 to transmit data indicative of the location of the aperture 152 and properties of the fluid flow and operate the receiver 206 to receive data from other downhole leak monitors, detectors. The processor 210 is further operable to perform other operations described herein. In some embodiments, the processor 210 is a sub-component of the sensors 202, the transmitter 204, or the receiver 206. In further embodiments, the processor 210 is a separate component that utilizes the sensors 202, the transmitter 204, the receiver 206, and the other components of the first downhole leak monitor 122A to perform the operations described herein.

The first downhole leak monitor 122A further includes a power source 212 that provides power to the first downhole leak monitor 122A. In some embodiments, the power source 122A is a rechargeable. In one of such embodiments, the power source 212 includes an energy convertor that is operable to convert kinetic energy, such as vibrations generated during hydrocarbon production or generated from a downhole tool, such as the downhole tool 124, to electrical energy to recharge the power source 212. As such, the power source 212 may be recharged at the downhole location where the first downhole leak monitor 122A is deployed. Although FIG. 2A illustrates the first downhole leak monitor 122A, the foregoing paragraphs and FIG. 2 also describe and illustrate the components and operations of other downhole leak monitors that are deployed in the wellbore 106.

Figure 3:
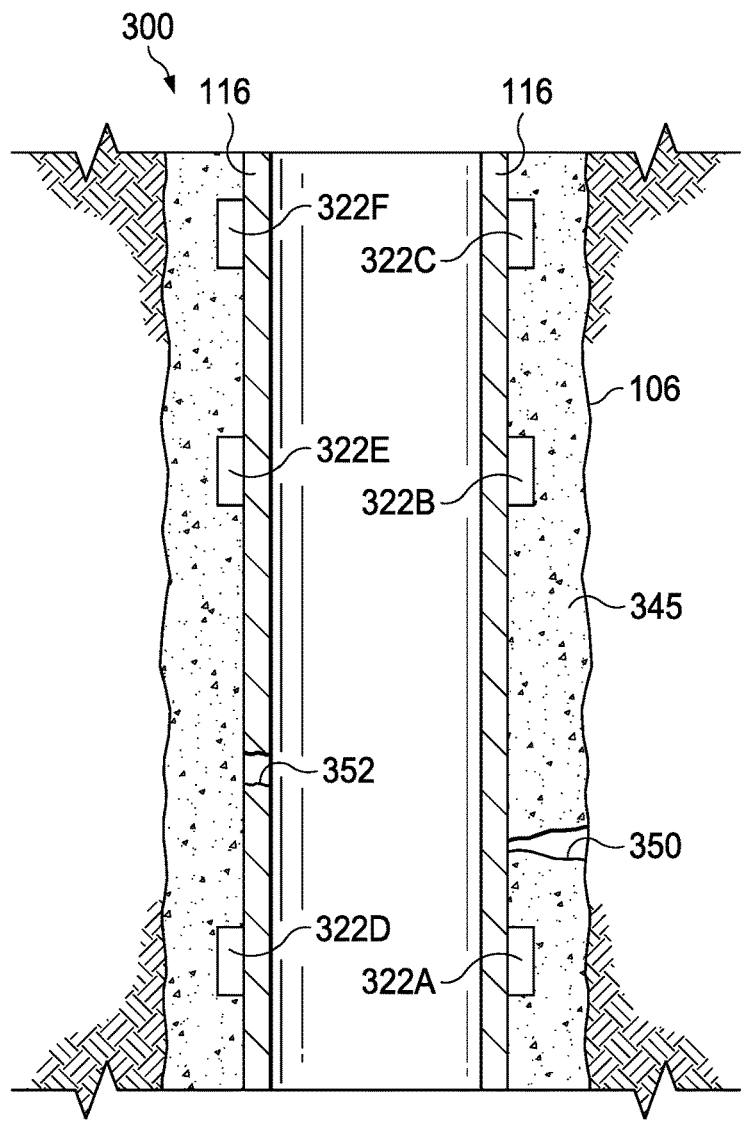
FIG. 3 illustrates a schematic, side view of the wellbore of FIG. 1A, where an aperture in a cement sheath and an aperture in the casing are present.

FIG. 3 illustrates a schematic, side view of the wellbore 106 of FIG. 1A, where a first aperture 350 in a cement sheath 345 and a second aperture 352 in the casing 116 are present. The cement sheath 345 fixedly secures the casing 116 to the wellbore 106 and forms a barrier that isolates the casing 116 from fluids (not shown) in the formation 112. The first aperture 350 allows fluids to penetrate the cement sheath 345, and come in contact with the casing 116.

A downhole leak monitor system 300 having a first, second, third, fourth, fifth, and sixth downhole leak monitors 322A-322F is deployed in the wellbore 106. Moreover, the first downhole leak monitor 322A is deposited along the casing 116 and is operable to perform the processes described herein to determine the properties of the fluid flow through the first aperture 350 and the location of the first aperture 350. Moreover, the first downhole leak monitor 322A is operable to determine the location of apertures formed on the external surface of the cement sheath 345 but have yet penetrated the internal surface of the cement sheath 345. As illustrated in FIG. 3, the first aperture 350 is formed in a region along the external surface of the cement sheath 345 but has not penetrated the internal surface of the cement sheath 345. In some embodiments, the first downhole leak monitor 322A is operable to monitor an external surface of the cement sheath 345 to determine a change in the material properties of a localized region of the cement sheath. In other embodiments, the first downhole leak monitor 322A is operable to monitor the cement sheath to determine a change in conductivity or resistivity in the localized region of the cement sheath 345. The first downhole leak monitor 322A then determines the location of the first aperture 350 based on the determined properties of the fluid flow. In some embodiments, the first downhole leak monitor 322A is further operable to determine the dimensions of the first aperture 350.

The first downhole leak monitor 322A is further operable to establish a connection with the second downhole leak monitor 322B or establish a long hop connection with the third downhole leak monitor 322C, and transmit data indicative of the fluid flow and the location of the first aperture 350 to the second downhole leak monitor 322B or the third downhole leak monitor 322C. The second and the third downhole leak monitors 322B and 322C may also perform the operations described in the foregoing paragraphs to detect properties of the fluid flow through the first aperture 350, determine the location of the first aperture 350, and transmit data indicative of the properties of the fluid flow through the first aperture 350 and the location of the first aperture 350 to another downhole leak monitor.

The casing 116 also forms a barrier that isolates the internal cavity of the casing 116 from fluids in an annulus (not shown) between the casing 116 and the wellbore 106 as well as fluids in the formation 112. The second aperture 352 is formed in a region of the casing 116 and penetrates through the external surface and the internal surface of the casing 116. The fourth, fifth, and sixth downhole leak monitors 322D-322E, similar to the first, second, and third downhole leak monitors 322A-322C, are each operable to perform the operations described in the foregoing paragraphs to detect properties of the fluid flow through the second aperture 352, determine the location of the second aperture 352, and transmit data indicative of the properties of the fluid flow through the second aperture 352 and the location of the second aperture 352 to another downhole leak monitor.

Figure 4:
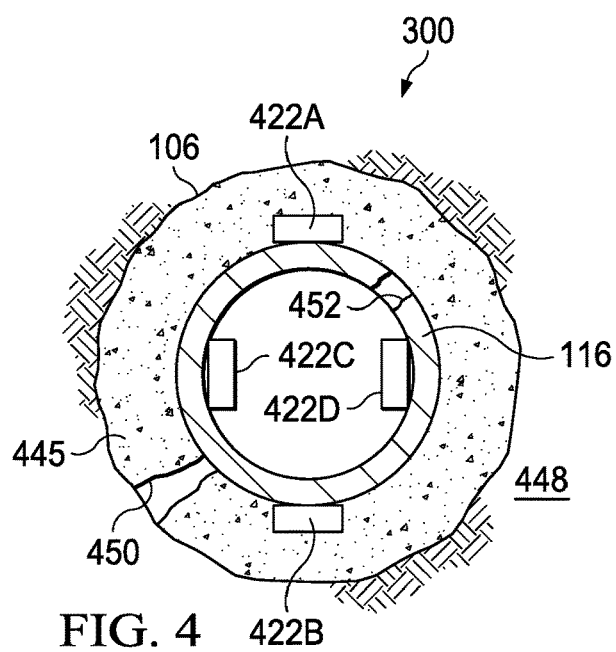
FIG. 4 illustrates a schematic, cross sectional view of the wellbore of FIG. 1A, where an aperture in a cement sheath and an aperture in the casing are present.

FIG. 4 illustrates a schematic, cross sectional view of the wellbore of FIG. 1A, where a first aperture 450 in a cement sheath 445 and a second aperture 452 in the casing 116 are present. In the embodiment of FIG. 4, the cement sheath 445 forms a barrier between the casing 116 and surrounding formation 448. Downhole leak monitors may be more sensitive to fluid flow at certain azimuth relative of said downhole leak monitors. As such, fluid flow sensitivity may be increased by deploying multiple downhole leak monitors azimuthally around a circumference of the casing.

A downhole leak monitor system 400 including a first, a second, a third, and a fourth downhole leak monitors 404A-D is deployed in the wellbore 106. The first downhole leak monitor 422A and the second downhole leak monitor 422B are each operable to perform operations described herein and are deployed azimuthally around a circumference approximately perpendicular to a longitudinal axis (not shown) of the casing 116. As such, the first aperture 450 is at a first azimuth relative to the first downhole leak monitor 422A and at a second azimuth relative to the second downhole leak monitor 422B. By deploying the first downhole leak monitor 422A and the second downhole leak monitor 422B azimuthally around the casing 116, the first and second downhole leak monitors may obtain properties of the fluid flow and the location of the first aperture 450 from different azimuths. In some embodiments, the data determined by the second downhole leak monitor 422B and indicative of properties of the fluid flow are provided to the first downhole leak monitor 422A. The first downhole leak monitor 422A then performs an azimuthal analysis of the location of the first aperture 450 based on data detected by the first downhole leak monitor 422a and indicative of the property of the fluid flow, and also based on data received from the second downhole leak monitor 422B and indicative of the properties of the fluid flow.

The third downhole leak monitor 422C and the fourth downhole leak monitor 422D are deployed along an internal surface of the casing 116 and are deployed azimuthally around a circumference approximately perpendicular to the longitudinal axis of the casing 116. The third and the fourth downhole leak monitors 422C and 422D, similar to the first and the second downhole leak monitors 422A and 422B, are operable to obtain properties of fluid flow through the second aperture and the location of the first aperture 450 from different azimuths, thereby increasing overall accuracy of the downhole leak monitor system 400.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a downhole leak monitor system comprising a plurality of downhole leak monitors, each downhole leak monitor of the plurality of downhole leak monitors deployed along a casing of a wellbore, and each downhole leak monitor of the plurality of downhole leak monitors operable to detect at least one property of a fluid flow through an aperture of a barrier determine a location of the aperture establish a connection with at least one other downhole leak monitor of the plurality of downhole leak monitors, the connection being one of a plurality of connections, together which, communicatively connects the downhole leak monitor to a top downhole leak monitor of the plurality of downhole leak monitors, the top downhole leak monitor being a downhole leak monitor most proximate to a surface of the wellbore; and transmit data indicative of the at least one property of the fluid flow and the location of the aperture to the at least one other downhole leak monitor of the plurality of downhole leak monitors.

Clause 2, the downhole leak monitor system of clause 1, wherein the at least one property of the fluid flow comprises one or more of a material property of the fluid flow, a flow rate of the fluid flow, a conductivity of the fluid flow, a resistivity of the fluid flow, an amount of acoustic pressure emitted by the fluid flow, a velocity of the fluid flow, and an acceleration of the fluid flow.

Clause 3, the downhole leak monitor system of clause 1 or 2, wherein the plurality of downhole leak monitors comprises a first downhole leak monitor deployed at a first location along the casing; and a second downhole leak monitor deployed at a second location along the casing, wherein the first downhole leak monitor is further operable to receive data indicative of the at least one property of the fluid flow and the location of the aperture from the second downhole leak monitor; and determine the location of the aperture based on data detected by the first downhole leak monitor and indicative the at least one property of the fluid flow and based on data received from the second downhole leak monitor and indicative of the at least one property of the fluid flow.

Clause 4, the downhole leak monitor system of any one of clauses 1-3, wherein the barrier is a cement sheath that isolates a first zone of the wellbore from a second zone of the wellbore, wherein first downhole leak monitor and the second downhole leak monitor are deployed along an internal surface of the casing in the first zone of the wellbore, and wherein the first and second downhole leak monitors are each operable to detect fluid flow into the first zone of the wellbore.

Clause 5, the downhole leak monitor system of any one of clauses 1-4, wherein the first downhole leak monitor is operable to triangulate the location of the aperture based on data detected by the first downhole leak monitor and indicative the at least one property of the fluid flow and based on data received from the second downhole leak monitor and indicative of the at least one property of the fluid flow.

Clause 6, the downhole leak monitor system of any one of clauses 1-5, wherein the first downhole leak monitor and the second downhole leak monitor are deployed azimuthally around a circumference approximately perpendicular to a longitudinal axis of the casing, and wherein the first downhole leak monitor is further operable to perform an azimuthal analysis of the location of the aperture based on data detected by the first downhole leak monitor and indicative the at least one property of the fluid flow and based on data received from the second downhole leak monitor and indicative of the at least one property of the fluid flow.

Clause 7, the downhole leak monitor system of any one of clauses 1-6, further comprising at least one fluid flow detector deployed along an annulus between the casing and the wellbore, wherein each fluid flow detector of the at least one fluid flow detector is operable to detect the fluid flow through the aperture of the barrier; determine the location of the aperture; and transmit data indicative of the location of the aperture to one or more downhole leak monitors of the plurality of downhole leak monitors.

Clause 8, the downhole leak monitor system of any one of clauses 1-7, further comprising a telecommunication cable deployed in the wellbore and communicatively connected to a top downhole leak monitor of the plurality of downhole leak monitors and operable to transmit data indicative of the at least one property of the fluid flow and the location of the aperture to a surface based electronic device.

Clause 9, the downhole leak monitor system of clauses 1-8, wherein the telecommunication cable is at least one of a wireline cable and an optical fiber.

Clause 10, The downhole leak monitor system of any one of clauses 1-9, wherein each downhole leak monitor of the plurality of downhole leak monitors further comprises a rechargeable power source; and an energy converter coupled to the power source and operable to convert an non-electrical form of energy into electrical energy; and provide the electrical energy to the rechargeable power source.

Clause 11, the downhole leak monitor system of any one of clauses 1-10, wherein each downhole leak monitor of the plurality of downhole leak monitors is further operable to establish a long hop connection with a non-adjacent downhole leak monitor; and transmit data indicative of the at least one property of the fluid flow and the location of the aperture to the non-adjacent downhole leak monitor.

Clause 12, the downhole leak monitor system of any one of clauses 1-11, wherein each downhole leak monitor of the plurality of downhole leak monitors is further operable to: establish a connection with a downhole tool deployed in the casing of the wellbore; and transmit data indicative of the at least one property of the fluid flow and the location of the aperture to the downhole tool.

Clause 13, a method to monitor a leak in a downhole environment, the method comprising detecting, by a first downhole leak monitor of a plurality of downhole leak monitors deployed along a casing of a wellbore, at least one property of a fluid flow through an aperture of a barrier; determining a location of the aperture based on the at least one property of the fluid flow; establishing a connection with a second downhole leak monitor of the plurality of downhole leak monitors, the connection being one of a plurality of connections together which, communicatively connects each downhole leak monitor of the plurality of downhole leak monitors; and transmitting data indicative of the at least one property of the fluid flow and the location of the aperture to the second downhole leak monitor of the plurality of downhole leak monitors.

Clause 14, the method of clause 13, further comprising receiving data indicative of the at least one property of the fluid flow and the location of the aperture from the second downhole leak monitor; and determining the location of the aperture based on data detected by the first downhole leak monitor and indicative the at least one property of the fluid flow and based on data received from the second downhole leak monitor and indicative of the at least one property of the fluid flow.

Clause 15, the method of clause 13 or 14, wherein determining the location of the aperture comprises triangulating the location of the aperture based on data detected by the first downhole leak monitor and indicative of the at least one property of the fluid flow and based on data received from the second downhole leak monitor and indicative of the at least one property of the fluid flow.

Clause 16, the method of any one of clauses 13-15, further comprising receiving data indicative of the at least one property of the fluid flow and the location of the aperture from a fluid flow detector that is deployed in an annulus between the casing and the wellbore, wherein determining the location of the aperture comprises determining the location of the aperture based on data received from the fluid flow detector and indicative of the at least one property of the fluid flow.

Clause 17, a downhole leak monitor comprising a sensor operable to detect at least one property of a fluid flow through an aperture of a barrier; a processor operable to determine a location of the aperture based on the at least one property of the fluid flow through the aperture; and a transmitter operable to establish a connection with at least one downhole leak monitor of a plurality of downhole leak monitors deployed along a casing of a wellbore, the connection being one of a plurality of connections together which, communicatively connects each downhole leak monitor of the plurality of downhole leak monitors; and transmit data indicative of the at least one property of the fluid flow and the location of the aperture to the at least one downhole leak monitor of the plurality of downhole leak monitors.

Clause 18, the downhole leak monitor of clause 17, further comprising a rechargeable power source; and an energy converter coupled to the power source and operable to convert a non-electrical form of energy into electrical energy; and provide the electrical energy to the rechargeable power source.

Clause 19, the downhole leak monitor of clause 17 or 18, further comprising a receiver operable to receive data indicative of at least one property of the fluid flow from another downhole leak monitor, wherein the processor is further operable to triangulate the location of the aperture based on the at least one fluid property detected by the sensor and based on data received from the other downhole leak monitor and indicative of the at least one property of the fluid flow.

Clause 20, the downhole leak monitor of any one of causes 17-19, wherein the wherein the transmitter is further operable to: establish a connection with a downhole tool deployed in the casing of the wellbore; and transmit data indicative of the at least one property of the fluid flow and the location of the aperture to the downhole tool.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. A downhole leak monitor system comprising:
 a plurality of downhole leak monitors, each downhole leak monitor of the plurality of downhole leak monitors deployed outside a casing of a wellbore, and each downhole leak monitor of the plurality of downhole leak monitors operable to:
  detect, from a respective monitor location that is outside the casing, at least one property of a fluid flow through an aperture of a barrier;
  determine, from the respective monitor location, a location of the aperture;
  establish, at the respective monitor location, a connection with at least one other downhole leak monitor of the plurality of downhole leak monitors, the connection being one of a plurality of connections, together which, communicatively connects the downhole leak monitor to a top downhole leak monitor of the plurality of downhole leak monitors, the top downhole leak monitor being a downhole leak monitor most proximate to a surface of the wellbore;
  transmit, from the respective monitor location, data indicative of the at least one property of the fluid flow and the location of the aperture to the at least one other downhole leak monitor of the plurality of downhole leak monitors; and
  convert kinetic energy into electrical energy to recharge a rechargeable power source component of the downhole leak monitor.

2. The downhole leak monitor system of claim 1, wherein the at least one property of the fluid flow comprises one or more of a material property of the fluid flow, a flow rate of the fluid flow, a conductivity of the fluid flow, a resistivity of the fluid flow, an amount of acoustic pressure emitted by the fluid flow, a velocity of the fluid flow, and an acceleration of the fluid flow.

3. The downhole leak monitor system of claim 1, wherein the plurality of downhole leak monitors comprises:
 a first downhole leak monitor deployed at a first location along the casing; and
 a second downhole leak monitor deployed at a second location along the casing,
 wherein the first downhole leak monitor is further operable to:
  receive data indicative of the at least one property of the fluid flow and the location of the aperture from the second downhole leak monitor; and
  determine the location of the aperture based on data detected by the first downhole leak monitor and indicative of the at least one property of the fluid flow and based on data received from the second downhole leak monitor and indicative of the at least one property of the fluid flow.

4. The downhole leak monitor system of claim 3, wherein the barrier is a cement sheath that isolates a first zone of the wellbore from a second zone of the wellbore, wherein the first downhole leak monitor and the second downhole leak monitor are deployed along an internal surface of the casing in the first zone of the wellbore, and wherein the first and second downhole leak monitors are each operable to detect fluid flow into the first zone of the wellbore.

5. The downhole leak monitor system of claim 3, wherein the first downhole leak monitor is operable to triangulate the location of the aperture based on data detected by the first downhole leak monitor and indicative of the at least one property of the fluid flow and based on data received from the second downhole leak monitor and indicative of the at least one property of the fluid flow.

6. The downhole leak monitor system of claim 5, wherein the first downhole leak monitor and the second downhole leak monitor are deployed azimuthally around a circumference substantially perpendicular to a longitudinal axis of the casing, and wherein the first downhole leak monitor is further operable to perform an azimuthal analysis of the location of the aperture based on data detected by the first downhole leak monitor and indicative of the at least one property of the fluid flow and based on data received from the second downhole leak monitor and indicative of the at least one property of the fluid flow.

7. The downhole leak monitor system of claim 1, further comprising at least one fluid flow detector deployed along an annulus between the casing and the wellbore, wherein each fluid flow detector of the at least one fluid flow detector is operable to:
  detect the fluid flow through the aperture of the barrier;
  determine the location of the aperture; and
  transmit data indicative of the location of the aperture to one or more downhole leak monitors of the plurality of downhole leak monitors.

8. The downhole leak monitor system of claim 1, further comprising a telecommunication cable deployed in the wellbore and communicatively connected to a top downhole leak monitor of the plurality of downhole leak monitors and operable to transmit data indicative of the at least one property of the fluid flow and the location of the aperture to a surface based electronic device.

9. The downhole leak monitor system of claim 8, wherein the telecommunication cable is at least one of a wireline cable and an optical fiber.

10. The downhole leak monitor system of claim 1, wherein each downhole leak monitor of the plurality of downhole leak monitors further comprises:
  an energy converter coupled to the rechargeable power source component and operable to:
    convert a non-electrical form of energy into electrical energy; and
    provide the electrical energy to the rechargeable power source component.

11. The downhole leak monitor system of claim 1, wherein each downhole leak monitor of the plurality of downhole leak monitors is further operable to:
  establish a long hop connection with a non-adjacent downhole leak monitor; and
  transmit data indicative of the at least one property of the fluid flow and the location of the aperture to the non-adjacent downhole leak monitor.

12. The downhole leak monitor system of claim 1, wherein each downhole leak monitor of the plurality of downhole leak monitors is further operable to:
  establish a connection with a downhole tool deployed in the casing of the wellbore; and
  transmit data indicative of the at least one property of the fluid flow and the location of the aperture to the downhole tool.

13. A method to monitor a leak in a downhole environment, the method comprising:
  detecting, by a first downhole leak monitor of a plurality of downhole leak monitors deployed outside a casing of a wellbore, at least one property of a fluid flow through an aperture of a barrier;
  determining, from a monitor location that is outside of the casing, a location of the aperture based on the at least one property of the fluid flow;
  establishing, at the monitor location, a connection with a second downhole leak monitor of the plurality of downhole leak monitors, the connection being one of a plurality of connections together which, communicatively connects each downhole leak monitor of the plurality of downhole leak monitors;
  transmitting, from the monitor location, data indicative of the at least one property of the fluid flow and the location of the aperture to the second downhole leak monitor of the plurality of downhole leak monitors; and
  converting kinetic energy into electrical energy to recharge a rechargeable power source component of the first downhole leak monitor.

14. The method of claim 13, further comprising:
  receiving data indicative of the at least one property of the fluid flow and the location of the aperture from the second downhole leak monitor; and
  determining the location of the aperture based on data detected by the first downhole leak monitor and indicative of the at least one property of the fluid flow and based on data received from the second downhole leak monitor and indicative of the at least one property of the fluid flow.

15. The method of claim 14, wherein determining the location of the aperture comprises triangulating the location of the aperture based on data detected by the first downhole leak monitor and indicative of the at least one property of the fluid flow and based on data received from the second downhole leak monitor and indicative of the at least one property of the fluid flow.

16. The method of claim 13, further comprising:
  receiving data indicative of the at least one property of the fluid flow and the location of the aperture from a fluid flow detector that is deployed in an annulus between the casing and the wellbore,
  wherein determining the location of the aperture comprises determining the location of the aperture based on data received from the fluid flow detector and indicative of the at least one property of the fluid flow.

17. A downhole leak monitor comprising:
  a sensor located at a sensor location outside of a casing of a wellbore and operable to detect, from the sensor location, at least one property of a fluid flow through an aperture of a barrier;
  a processor operable to determine, from the sensor location, a location of the aperture based on the at least one property of the fluid flow through the aperture;
  an energy convertor configured to convert kinetic energy into electrical energy to recharge a rechargeable power source component of the first downhole leak monitor; and
  a transmitter operable to:
    establish, at the sensor location, a connection with at least one downhole leak monitor of a plurality of downhole leak monitors deployed along a casing of a wellbore, the connection being one of a plurality of connections together which, communicatively connects each downhole leak monitor of the plurality of downhole leak monitors; and transmit, from the sensor location, data indicative of the at least one property of the fluid flow and the location of the aperture to the at least one downhole leak monitor of the plurality of downhole leak monitors.

18. The downhole leak monitor of claim 17, wherein the power source is operable to provide the electrical energy to the downhole leak monitor.

19. The downhole leak monitor of claim 17, further comprising:

a receiver operable to receive data indicative of at least one property of the fluid flow from another downhole leak monitor, wherein the processor is further operable to triangulate the location of the aperture based on the at least one fluid property detected by the sensor and based on data received from the other downhole leak monitor and indicative of the at least one property of the fluid flow.

20. The downhole leak monitor of claim 17, wherein the transmitter is further operable to:

establish a connection with a downhole tool deployed in the casing of the wellbore; and transmit data indicative of the at least one property of the fluid flow and the location of the aperture to the downhole tool.

\* \* \* \* \*